(12) United States Patent
Lu et al.

(10) Patent No.: US 12,169,775 B2
(45) Date of Patent: Dec. 17, 2024

(54) METHODS AND SYSTEMS FOR ENHANCED SCENE PERCEPTION USING VEHICLE PLATOON

(71) Applicant: Toyota Motor Engineering & Manufacturing North America, Inc., Plano, TX (US)

(72) Inventors: Hongsheng Lu, San Jose, CA (US); Bin Cheng, New York, NY (US); Rui Guo, San Jose, CA (US); Onur Altintas, Mountain View, CA (US); John Kenney, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 330 days.

(21) Appl. No.: 17/066,004

(22) Filed: Oct. 8, 2020

(65) Prior Publication Data

US 2022/0114433 A1 Apr. 14, 2022

(51) Int. Cl.
| | |
|---|---|
| *G06N 3/08* | (2023.01) |
| *G05D 1/00* | (2024.01) |
| *G06F 18/21* | (2023.01) |
| *G06F 18/2415* | (2023.01) |
| *G06V 20/58* | (2022.01) |
| *G08G 1/00* | (2006.01) |
| *H04W 4/44* | (2018.01) |
| *H04W 4/46* | (2018.01) |

(52) U.S. Cl.
CPC .............. *G06N 3/08* (2013.01); *G05D 1/0291* (2013.01); *G06F 18/21* (2023.01); *G06F 18/2415* (2023.01); *G06V 20/58* (2022.01); *G08G 1/22* (2013.01); *H04W 4/44* (2018.02); *H04W 4/46* (2018.02)

(58) Field of Classification Search
CPC ........ G06N 3/08; G06V 20/58; G05D 1/0291; G06K 9/6217; G06K 9/6277; G08G 1/22; H04W 4/46; H04W 4/44
See application file for complete search history.

(56) References Cited

U.S. PATENT DOCUMENTS

| | | | |
|---|---|---|---|
| 10,459,444 B1 | 10/2019 | Kentleyklay | |
| 10,627,823 B1 * | 4/2020 | Kim | ..................... G05D 1/0221 |
| 10,994,727 B1 * | 5/2021 | Kumar | ............... G06Q 30/0213 |

(Continued)

FOREIGN PATENT DOCUMENTS

WO 2020007987 A1 1/2020

*Primary Examiner* — Dale W Hilgendorf
*Assistant Examiner* — Hana Lee
(74) *Attorney, Agent, or Firm* — Dinsmore & Shohl LLP (57) ABSTRACT

A vehicle includes one or more sensors configured to obtain raw data related to a scene, one or more processors, and machine readable instructions stored in one or more memory modules. The one machine readable instructions, when executed by the one or more processors, cause the vehicle to: process the raw data with a first neural network stored in the one or more memory modules to obtain a first prediction about the scene, transmit the raw data to a computing device external to the vehicle, receive a second prediction about the scene from the computing device in response to transmitting the raw data to the computing device, and determine an updated prediction about the scene based on a combination of the first prediction and the second prediction.

17 Claims, 7 Drawing Sheets

(56) References Cited

U.S. PATENT DOCUMENTS

| | | | |
|---|---|---|---|
| 2010/0256852 A1* | 10/2010 | Mudalige | G08G 1/22 |
| | | | 701/24 |
| 2016/0295589 A1* | 10/2016 | Nikopour | H04W 4/023 |
| 2018/0121740 A1* | 5/2018 | Boss | B60T 8/17 |
| 2018/0121763 A1* | 5/2018 | Surnilla | G06V 10/809 |
| 2018/0268698 A1* | 9/2018 | Michalakis | G08G 1/0112 |
| 2019/0025857 A1 | 1/2019 | Luckevich et al. | |
| 2019/0050718 A1* | 2/2019 | Tickoo | G01C 21/28 |
| 2019/0080373 A1 | 3/2019 | Takoshima et al. | |
| 2019/0236955 A1* | 8/2019 | Hu | G05D 1/0212 |
| 2019/0349719 A1* | 11/2019 | Pattan | H04W 4/08 |
| 2020/0012295 A1* | 1/2020 | Kim | G08G 1/22 |
| 2020/0027355 A1* | 1/2020 | Sujan | H04W 4/023 |
| 2020/0133307 A1* | 4/2020 | Kelkar | G06K 9/6288 |
| 2020/0150684 A1 | 5/2020 | Kim | |
| 2021/0200229 A1* | 7/2021 | Refaat | G05D 1/0221 |
| 2021/0304611 A1* | 9/2021 | Hughes | B60Q 9/008 |
| 2022/0108131 A1* | 4/2022 | Kuen | G06T 7/00 |
| 2022/0126864 A1* | 4/2022 | Moustafa | B60W 60/001 |
| 2023/0038372 A1* | 2/2023 | Yu | G05D 1/0295 |
| 2024/0075950 A1* | 3/2024 | Fahoum | B60W 60/00274 |

* cited by examiner

METHODS AND SYSTEMS FOR ENHANCED SCENE PERCEPTION USING VEHICLE PLATOON

TECHNICAL FIELD

The present specification relates to scene perception using different neural networks stored in different vehicles of a vehicle platoon.

BACKGROUND

A vehicle platoon is a group of vehicles that can travel very closely together. Each vehicle communicates with other vehicles in the vehicle platoon. A lead vehicle controls the speed and direction, and all following vehicles respond to the lead vehicle's movement. In the vehicle platoon, following vehicles rarely contribute to the driving performance of the lead vehicle.

Accordingly, a need exists for providing a method and system for utilizing resources of following vehicles in a vehicle platoon to enhance driving performance of the overall vehicle platoon.

SUMMARY

The present disclosure provides systems and methods for predicting and classifying objects external to a vehicle platoon using different neural networks stored in different vehicles of the vehicle platoon.

In one embodiment, a vehicle includes one or more sensors configured to obtain raw data related to a scene, one or more processors, and machine readable instructions stored in one or more memory modules. The machine readable instructions, when executed by the one or more processors, cause the vehicle to: process the raw data with a first neural network stored in the one or more memory modules to obtain a first prediction about the scene, transmit the raw data to a computing device external to the vehicle, receive a second prediction about the scene from the computing device in response to transmitting the raw data to the computing device, and determine an updated prediction about the scene based on a combination of the first prediction and the second prediction.

In another embodiment, a vehicle platoon system includes a lead vehicle and a following vehicle. The lead vehicle includes one or more sensors configured to obtain raw data related to a scene and a first controller configured to process the raw data with a first neural network to obtain a first prediction about the scene. The following vehicle includes a second controller configured to process the raw data received from the lead vehicle with a second neural network to obtain a second prediction. The first controller is configured to transmit the raw data to the following vehicle, receive the second prediction about the scene from the following vehicle in response to transmitting the raw data to the following vehicle, and determine an updated prediction based on a combination of the first prediction and the second prediction.

In yet another embodiment, a method includes obtaining raw data related to a scene using one or more sensors of a lead vehicle, processing the raw data with a first neural network stored in the lead vehicle to obtain a first prediction about the scene, transmitting the raw data to a following vehicle, receiving a second prediction about the scene from the following vehicle in response to transmitting the raw data to the following vehicle, and determining an updated prediction about the scene based on a combination of the first prediction and the second prediction.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
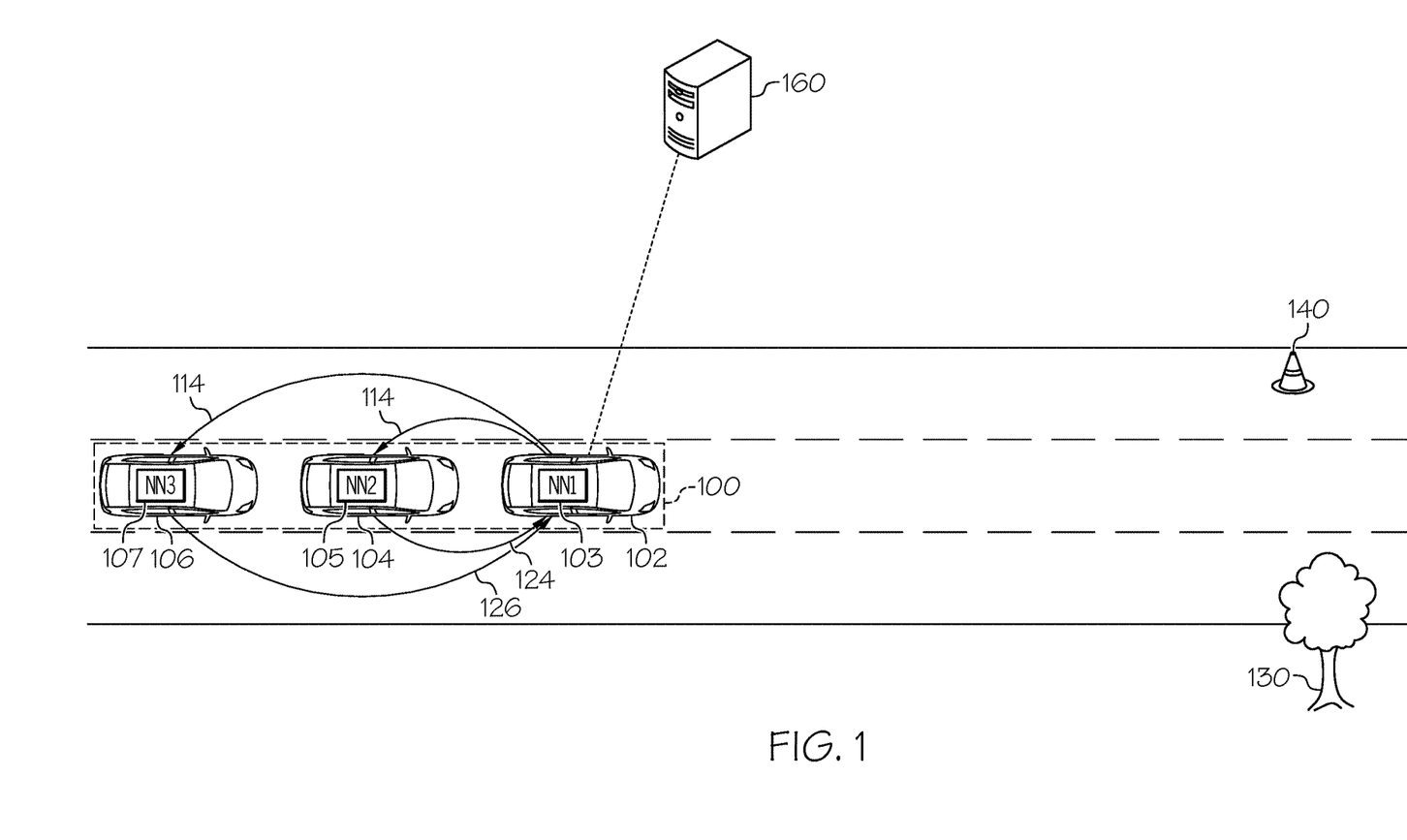
FIG. 1 schematically depicts a vehicle platoon system that perceives a scene, for example, application of detecting and analyzing interesting elements in a scene, using different neural networks stored in different vehicles, according to one or more embodiments shown and described herein.
Figure 2:
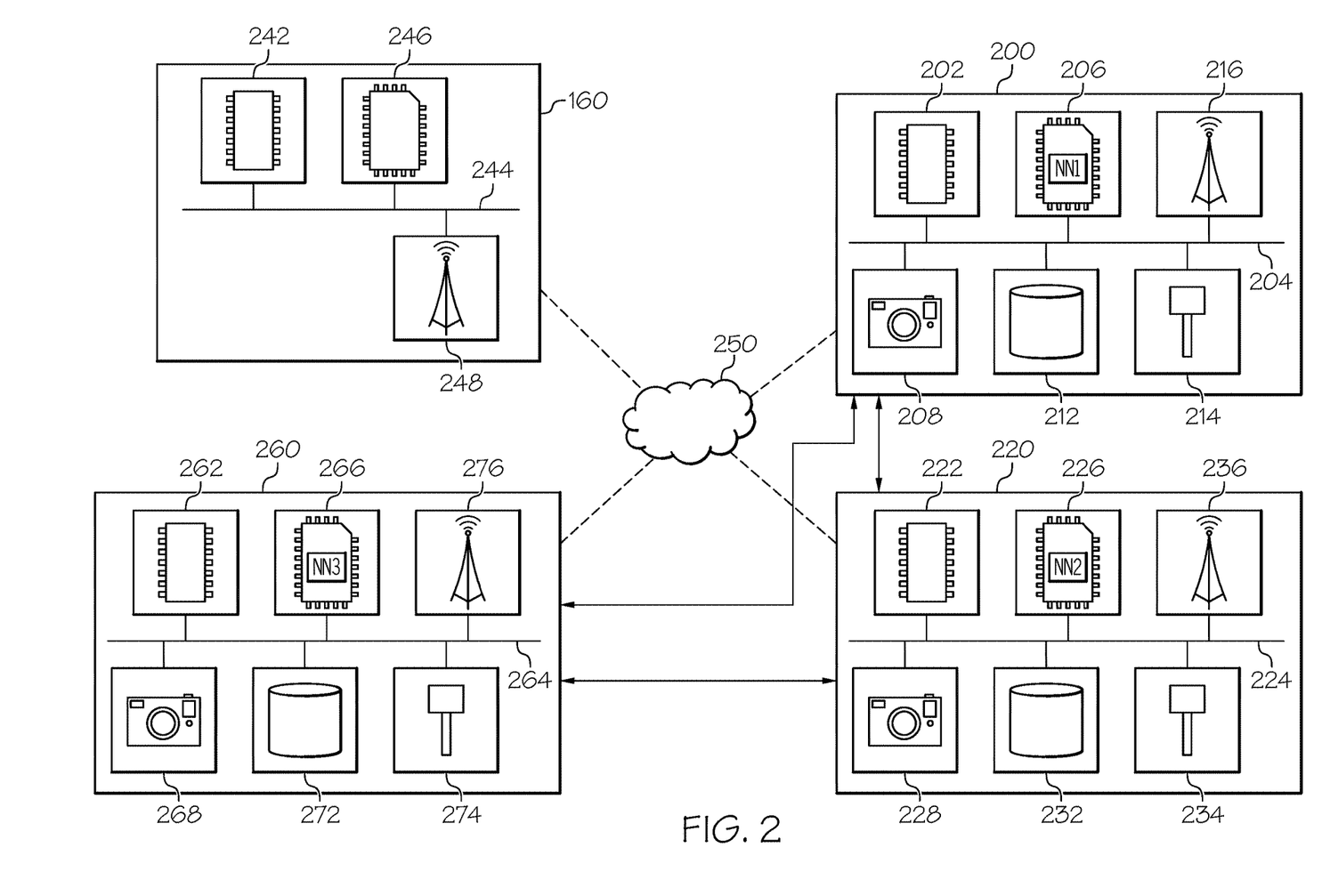
FIG. 2 depicts a schematic diagram for a system that perceives a scene with or without external objects using different neural networks stored in different vehicles, according to one or more embodiments shown and described herein.

The embodiments disclosed herein include systems and methods for perceiving scenes external to a vehicle platoon using different neural networks stored in different vehicles of the vehicle platoon. Referring to FIGS. 1 and 2, a vehicle platoon system 100 includes a lead vehicle 102 and following vehicles 104 and 106. The lead vehicle 102 includes one or more sensors configured to obtain raw data, e.g., an image 114 of a scene with or without an object external to the vehicle platoon system 100. The lead vehicle 102 includes a controller configured to process the raw data with a neural network 103 to obtain a first prediction about the scene. The prediction about the scene may include segmenting the scene, detecting one or more objects in the scene, and/or classifying one or more objects in the scene. The following vehicle 104 includes a controller configured to process the raw data received from the lead vehicle 102 with a neural network 105 to obtain a second prediction 124 about the scene. The neural network 105 is different form the neural network 103. For example, the parameters, nodes and/or layers of the neural network 105 may be different from the parameters, nodes and/or layers of the neural network 103.

The controller of the lead vehicle 102 transmits the raw data to the following vehicle 104, receives the second prediction 124 about the scene from the following vehicle 104 in response to transmitting the raw data to the following vehicle 104, and determines an updated prediction based on a combination of the first prediction and the second prediction 124. The lead vehicle 102 may also receive a third prediction 126 about the scene made by the neural network 107 of the following vehicle 106, and determine an updated prediction based on a combination of the first prediction, the second prediction 124, and the third prediction 126.

According to the present disclosure, a vehicle platoon includes a lead vehicle and one or more following vehicles. The one or more following vehicles may have a relatively easier driving environment as compared to the lead vehicle. The following vehicles may only be required to stay in a lane and maintain a certain distance from the vehicle ahead. As a consequence, the following vehicles may turn off or reduce use of some sensors (e.g., long distance radar sensors, Lidar sensors, and some cameras) and/or slow down or stop processing tasks (e.g., computationally intensive neural network execution tasks related to the particular vehicle) and operated mainly utilizing radar sensors and V2X communication. The saved processing power of the following vehicles may be redirected to help improve the neural network performance of the lead vehicle. Specifically, each of the following vehicles may receive raw data from the lead vehicle and process the raw data using its own neural network that is different from the neural network of the lead vehicle. The predictions by the neural networks of the following vehicles may be transmitted to the lead vehicle. The lead vehicle may combine its predictions made by the neural network of the lead vehicle and the predictions made by the neural networks of the following vehicles. The combined predictions may hence overall performance of the vehicle platoon because the combined prediction may enhance the accuracy of the prediction by the lead vehicle. For example, the combined prediction may prevent erroneous prediction by the lead vehicle due to errors in sensors, the neural network, or any other processing error.

FIG. 1 schematically depicts a vehicle platoon system that perceives a scene, for example, detecting and classifying external objects, using different neural networks stored in different vehicles, according to one or more embodiments shown and described herein.

In embodiments, a vehicle platoon system 100 may include a plurality of vehicles including a lead vehicle 102 and following vehicles 104 and 106. While FIG. 1 illustrates two following vehicles 104 and 106, the vehicle platoon system 100 may include more than or less than two following vehicles. The vehicle platoon system 100 may communicate with a server 160. The server 160 may be a remote server such as a cloud server. In some embodiments, the server 160 may be a local server including, but not limited to, a roadside unit, an edge server, and the like.

Each of the lead vehicle 102 and the following vehicles 104 and 106 may be a vehicle including an automobile or any other passenger or non-passenger vehicle such as, for example, a terrestrial, aquatic, and/or airborne vehicle. In some embodiment, one or more of the lead vehicle 102 and the following vehicles 104 and 106 may be an unmanned aerial vehicle (UAV), commonly known as a drone.

One or more of the lead vehicle 102 and the following vehicles 104 and 106 may be autonomous and connected vehicles, each of which navigates its environment with limited human input or without human input. The lead vehicle 102 and the following vehicles 104 and 106 are equipped with internet access and share data with other devices both inside and outside the lead vehicle 102 and the following vehicles 104 and 106. The lead vehicle 102 and the following vehicles 104 and 106 may communicate with the server 160. The server 160 may communicate with vehicles in an area covered by the server 160. The server 160 may communicate with other servers that cover different areas. The server 160 may communicate with a remote server and transmit information collected by the server 160 to the remote server.

The lead vehicle 102 and the following vehicles 104 and 106 form a vehicle platoon. A vehicle platoon is a group of vehicles that can travel very closely together. Each vehicle communicates with other vehicles in the platoon. The lead vehicle 102 controls the speed and direction, and the following vehicles 104 and 106 respond to the lead vehicle's movement.

In embodiments, each of the lead vehicle 102 and the following vehicles 104 and 106 may include a neural network for interpreting a scene, for example, segmenting the scene, detecting and/or classifying objects. For example, the lead vehicle 102 includes a neural network NN1 103, the following vehicle 104 includes a neural network NN2 105, and the following vehicle 106 includes a neural network NN3 107. The neural networks 103, 105, and 107 may include different layers, nodes, and/or parameters such that the neural networks 103, 105 and 107 may output different data with respect to the same input.

In some embodiments, the server 160 may transmit different neural networks to the vehicles 102, 104, and 106, respectively. For example, the server 160 may transmit the neural network NN1 103 to the lead vehicle 102, transmit the neural network NN2 105 to the following vehicle 104, and transmit the neural network NN3 107 to the following vehicle 106. In some embodiments, the server 160 may transmit the different neural networks when the vehicles 102, 104, and 106 form a vehicle platoon. For example, when the vehicles 102, 104, and 106 form the vehicle platoon system 100, the vehicle platoon system 100 transmits a notification to the server 160 that the vehicles 102, 104, and 106 formed the vehicle platoon system 100. In response, the server 160 may transmit and assign different neural networks 103, 105, 107 to vehicles 102, 104, and 106, respectively.

In some embodiments, each of the lead vehicle 102 and the following vehicles 104 and 106 may store a plurality of neural networks including neural networks 103, 105, and 107. The lead vehicle 102 may select one of the plurality of neural networks 103, 105, and 107 based on various factors including road conditions, a type of a road, a vehicle location, the status of a vehicle in a platoon (e.g., a lead vehicle or a following vehicle), time of the day, weather, and the like. Once the lead vehicle 102 selects the neural network 103 as a current neural network, then the lead vehicle 102 may transmit the information about the neural network 103 to the following vehicles 104 and 106. In response, each of the following vehicles 104 and 106 may select a neural network that is different from the neural network 103 of the lead vehicle 102. For example, the following vehicle 104 may select the neural network 105 as its current neural network, and the following vehicle 106 may select the neural network 107 as its current neural network.

The following vehicles 104 and 106 may only be required to stay in a lane and maintain a certain distance from the lead vehicle 102. As a consequence, the following vehicles 104 and 106 may turn off or reduce use of some sensors (e.g., long distance radar sensors, Lidar sensors, and some cameras) and/or slow down or stop processing tasks (e.g., computationally intensive neural network execution tasks related to a particular vehicle) and operate mainly utilizing radar sensors and vehicle-to-vehicle (V2V) or vehicle-to-everything (V2X) communication.

The saved processing power of the following vehicles 104 and 106 may be redirected to help improve the neural network performance of the lead vehicle 102 and hence overall performance of the vehicle platoon system 100. In embodiments, the lead vehicle 102 may obtain raw data related to a scene including an object 130 or an object 140 from a distance as illustrated in FIG. 1. For example, the lead vehicle 102 may capture an image of the object 130 using one or more sensors such as a forward facing camera, radar, and the like. The lead vehicle 102 may process the raw data to detect the object 130. Then, the lead vehicle 102 may obtain a first prediction about the scene including the object 130 with the neural network 103 stored in the lead vehicle 102. The prediction may be a predicted classification of an object. The lead vehicle 102 may transmit the raw data to the following vehicles 104 and 106. The following vehicle 104 may process the received raw data and detect the object 130. Then, the following vehicle 104 may obtain a second prediction 124 about the scene including the object 130 with the neural network 105 stored in the following vehicle 104. The following vehicle 104 transmits the second prediction 124 to the lead vehicle 102. Similarly, the following vehicle 106 may process the received raw data and detect the object 130. Then, the following vehicle 106 may obtain a third prediction 126 about the object 130 with the neural network 107 stored in the following vehicle 106. The following vehicle 106 transmits the third prediction 126 to the lead vehicle 102. The lead vehicle 102 may determine an updated prediction about the object 130 based on a combination of the first prediction, the second prediction 124, and the third prediction 126. Combining the predictions from multiple neural networks adds a bias that in turn counters the variance of a single trained neural network model. Because the lead vehicle 102 and the following vehicles 104 and 106 have different neural networks, combining their outcomes from different neural networks is expected to improve the perception performance. The details about combining the predictions will be described below with reference to FIGS. 3 through 6.

In some embodiments, the lead vehicle 102 may process the raw data and find no object in the scene. The lead vehicle 102 may transmit the raw data to the following vehicles 104 and 106. The following vehicle 104 may process the received raw data and find no object in the scene, and return a message that no object is identified in the scene to the lead vehicle 102. Similarly, the following vehicle 106 may process the received raw data and find no object in the scene, and return a message that no object is identified in the scene to the lead vehicle 102.

FIG. 2 depicts a schematic diagram for a system that perceives a scene with or without external objects using different neural networks stored in different vehicles, according to one or more embodiments shown and described herein. The system for perceiving a scene with or without external objects includes a lead vehicle system 200, following vehicle systems 220 and 260, and the server 160.

It is noted that, while the lead vehicle system 200 and the following vehicle systems 220 and 260 are depicted in isolation, each of the lead vehicle system 200 and the following vehicle systems 220 and 260 may be included within a vehicle in some embodiments, for example, respectively within each of the lead vehicle 102 and the following vehicles 104 and 106 of FIG. 1. In embodiments in which each of the lead vehicle system 200 and the following vehicle systems 220 and 260 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The lead vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The lead vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 206 may include one or more neural networks including the neural network 103. The one or more memory modules 206 may include machine readable instructions that, when executed by the one or more processors 202, cause the lead vehicle system 200 to receive raw data from one or more sensors, process raw data with the neural network 103 to obtain a first prediction about a scene, transmit the raw data to a computing device external to the vehicle, such as the following vehicle systems 220 and 260, receive predictions about the scene from the following vehicle systems 220 and 260, and determine an updated prediction about the scene based on a combination of the prediction by the lead vehicle system 200 and the predictions by the following vehicle systems 220 and 260.

Referring still to FIG. 2, the lead vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. The image data may include image data of a scene with or without the object 130 or the object 140 in FIG. 1. In some embodiments, the one or more sensors 208 may also provide navigation support. That is, data captured by the one or more sensors 208 may be used to autonomously or semi-autonomously navigate the lead vehicle 102.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image. Ranging sensors like radar may be used to obtain a rough depth and speed information for the view of the lead vehicle system 200. The lead vehicle system 200 may capture a scene with or without an object such as the object 130 or the object 140 in FIG. 1 using one or more imaging sensors. The one or more processors 202 may process the captured image with the neural network 103 to detect the object 130 or the object 140.

In operation, the one or more sensors 208 capture image data and communicate the image data to the one or more processors 202 and/or to other systems communicatively coupled to the communication path 204. The image data may be received by the one or more processors 202, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

The lead vehicle system 200 comprises a satellite antenna 214 coupled to the communication path 204 such that the communication path 204 communicatively couples the satellite antenna 214 to other modules of the lead vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The lead vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the lead vehicle system 200 comprises network interface hardware 216 for communicatively coupling the lead vehicle system 200 to the following vehicle systems 220 and 260 and/or the server 160. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the lead vehicle system 200 may transmit its data to the following vehicle systems 220 and 260 or the server 160. For example, the network interface hardware 216 of the lead vehicle system 200 may transmit captured images generated by the lead vehicle system 200, vehicle data, location data, information about the neural network 103 and the like to the following vehicle systems 220 and 260 or the server 160.

The lead vehicle system 200 may connect with one or more external vehicle systems (e.g., the following vehicle systems 220 and 260) and/or external processing devices (e.g., the server 160) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect (e.g., the network 250), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the lead vehicle system 200 may be communicatively coupled to the server 160 by the network 250. In one embodiment, the network 250 may include one or more computer networks (e.g., a personal area network, a local area network, or a wide area network), cellular networks, satellite networks and/or a global positioning system and combinations thereof. Accordingly, the lead vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, Zig-Bee, and/or other near field communication protocols. Suitable cellular networks include, but are not limited to, technologies such as LTE, WiMAX, UMTS, CDMA, and GSM.

Still referring to FIG. 2, the server 160 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The communication path 244 may be similar to the communication path 204 in some embodiments. The one or more memory modules 246 may include one or more neural networks and the network interface hardware 248 may transmit the one or more neural networks to the lead vehicle system 200 and/or the following lead vehicle systems 220 and 260 via the network 250.

Still referring to FIG. 2, the following vehicle system 220 includes one or more processors 222, one or more memory modules 226, one or more sensors 228, one or more vehicle sensors 232, a satellite antenna 234, network interface hardware 236, and a communication path 224 communicatively connected to the other components of the following vehicle system 220. The components of the following vehicle system 220 may be structurally similar to and have similar functions as the corresponding components of the lead vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the network interface hardware 236 corresponds to the network interface hardware 216, and the communication path 224 corresponds to the communication path 204). The one or more memory modules 226 may include one or more neural networks. The one or more processors 222 may select one of the one or more neural networks, e.g., the neural network NN2 105, which is different from the neural network NN1 103 of the lead vehicle system 200. The parameters, nodes and/or layers of the neural network NN2 105 may be different from the parameters, nodes and/or layers of the neural network NN1 103.

Similarly, the following vehicle system 260 includes one or more processors 262, one or more memory modules 266, one or more sensors 268, one or more vehicle sensors 272, a satellite antenna 274, network interface hardware 276, and a communication path 264 communicatively connected to the other components of the following vehicle system 260. The components of the following vehicle system 260 may be structurally similar to and have similar functions as the corresponding components of the lead vehicle system 200 (e.g., the one or more processors 262 corresponds to the one or more processors 202, the one or more memory modules 266 corresponds to the one or more memory modules 206, the one or more sensors 268 corresponds to the one or more sensors 208, the one or more vehicle sensors 272 corresponds to the one or more vehicle sensors 212, the satellite antenna 274 corresponds to the satellite antenna 214, the network interface hardware 276 corresponds to the network interface hardware 216, and the communication path 264 corresponds to the communication path 204). The one or more memory modules 266 may include one or more neural networks. The one or more processors 262 may select one of the one or more neural networks, e.g., the neural network NN3 107, which is different from the neural network NN1 103 of the lead vehicle system 200. The parameters, nodes and/or layers of the neural network NN3 107 may be different from the parameters, nodes and/or layers of the neural network NN1 103.

Figure 3:
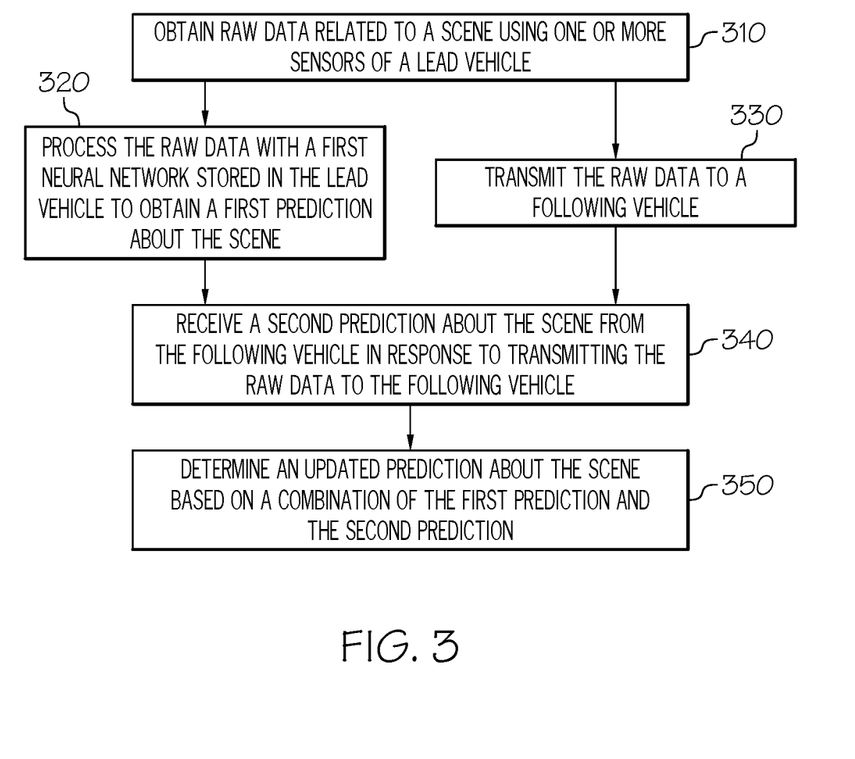
FIG. 3 depicts a flowchart for perceiving a scene with or without external objects using different neural networks stored in different vehicles, according to one or more embodiments shown and described herein.

FIG. 3 depicts a flowchart for perceiving a scene with or without external objects using different neural networks stored in different vehicles, according to one or more embodiments shown and described herein.

In step 310, a lead vehicle may obtains raw data related to a scene with or without an object using one or more sensors of the lead vehicle. In embodiments, by referring to FIGS. 1, 2, and 4, the lead vehicle system 200 may obtain an image 114 of an external view or a scene, of the lead vehicle 102 from one or more sensors 208. The image 114 may include the object 130 and/or the object 140. Ranging sensors such as radar sensors may be also used to determine a rough depth and speed information for the external view or the scene.

Figure 4:
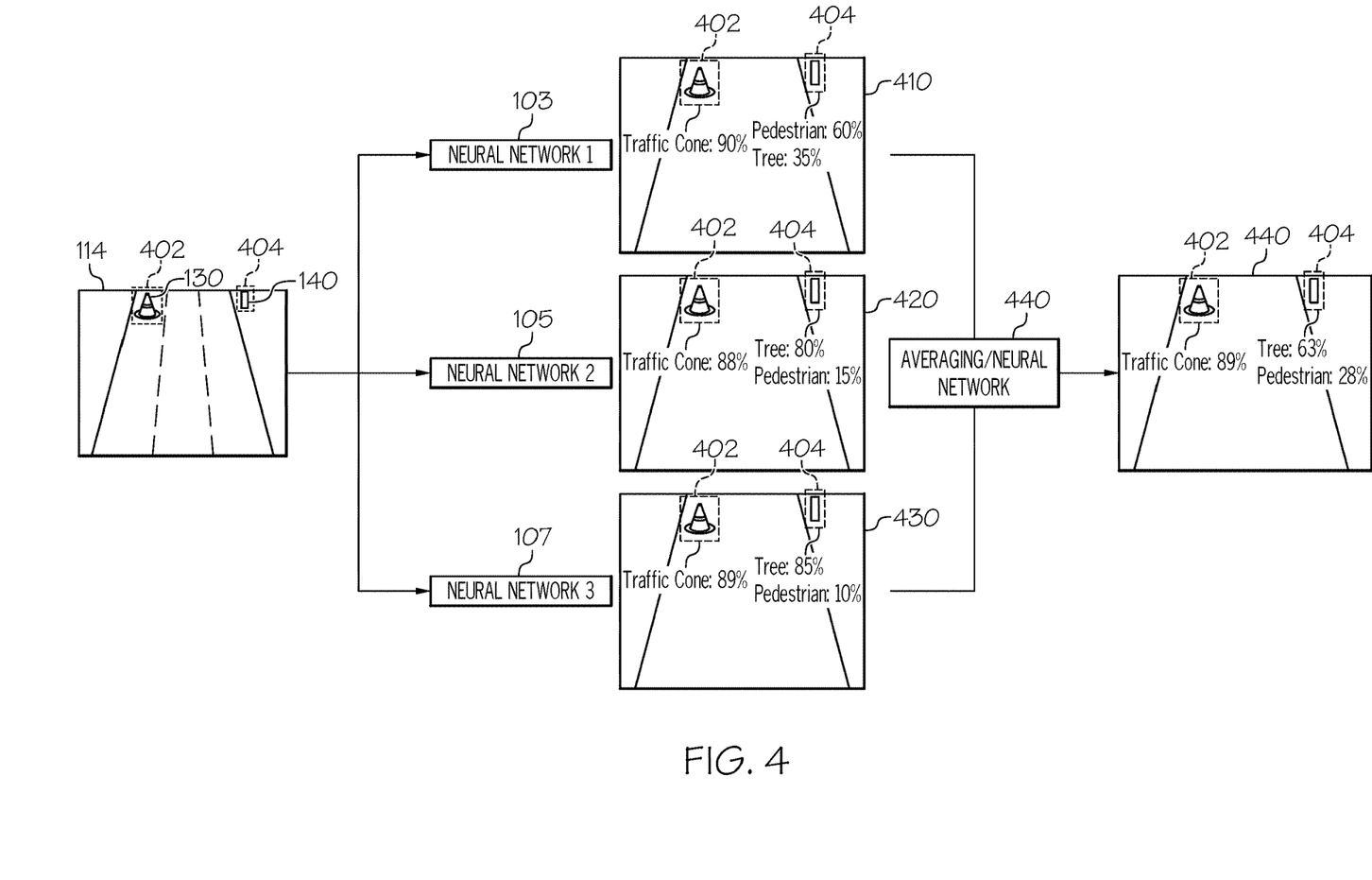
FIG. 4 depicts combining prediction results from different neural networks, according to one or more embodiments shown and described herein.

Referring back to FIG. 3, in step 320, the lead vehicle may process the raw data with a first neural network stored in the lead vehicle to obtain a first prediction about the scene. The first prediction about the scene may include segmenting the scene, detecting one or more objects in the scene, and/or classifying one or more objects in the scene. In embodiments, by referring to FIGS. 1, 2, and 4, the lead vehicle system 200 may process the image 114 using the neural network 103 to detect objects in the image 114. In embodiments, the captured image 114 may be segmented out at the instance level. Any object detection algorithm may be used to detect objects in the captured image. For example, as shown in FIG. 4, the lead vehicle system 200 may segment instances 402 and 404 from the captured image 114. Then, the segmented instances 402 and 404 may be input to the neural network 103. The neural network 103 may be a convolutional neural network that extracts features from each segmented instance and classifies the features as one of a known class with a probability. The neural network 103 may output classifications of the segmented instances 402 and 404 along with probabilities as shown in a box 410. For example, as illustrated in FIG. 4, the neural network 103 may predict the object 130 as a traffic cone with a probability of 90 percent. The neural network 103 may predict the object 140 as a pedestrian with a probability of 60 percent, and as a tree with a probability of 35 percent.

Referring back to FIG. 3, in step 330, the lead vehicle may transmit the raw data to a following vehicle. In embodiments, by referring to FIGS. 1, 2, and 4, the lead vehicle system 200 may transmit the image 114 captured by the lead vehicle 102 to following vehicles 104 and 106. The following vehicle system 220 of the following vehicle 104 may process the image 114 using the neural network 105 to classify objects in the image 114. In embodiments, the captured image 114 may be segmented out at the instance level. Any object detection algorithm may be used to detect objects in the captured image. For example, as shown in FIG. 4, the lead vehicle system 200 may segment instances 402 and 404 from the captured image 114. Then, the segmented instances 402 and 404 may be input to the neural network 105. The neural network 105 may be a convolutional neural network that extracts features from each segmented instance and classifies the features as one of a known class with a probability. The neural network 105 may output classifications of the segmented instances 402 and 404 along with probabilities as shown in a box 420. For example, as illustrated in FIG. 4, the neural network 105 may classify the object 130 as a traffic cone with a probability of 88 percent. The neural network 105 may classify the object 140 as a pedestrian with a probability of 15 percent, and as a tree with a probability of 80 percent.

Similarly, the following vehicle system 260 of the following vehicle 106 may process the image 114 using the neural network 107 to classify objects in the image 114. In embodiments, the captured image 114 may be segmented out at the instance level. Any object detection algorithm may be used to detect objects in the captured image. For example, as shown in FIG. 4, the lead vehicle system 200 may segment instances 402 and 404 from the captured image 114. Then, the segmented instances 402 and 404 may be input to the neural network 107. The neural network 107 may be a convolutional neural network that extracts features from each segmented instance and classifies the features as one of a known class with a probability. The neural network 107 may output classifications of the segmented instances 402 and 404 along with probabilities as shown in a box 430. For example, as illustrated in FIG. 4, the neural network 107 may classify the object 130 as a traffic cone with a probability of 89 percent. The neural network 107 may classify the object 140 as a pedestrian with a probability of 10 percent, and as a tree with a probability of 85 percent.

Referring back to FIG. 3, in step 340, the lead vehicle may receive a second prediction about the scene from the following vehicle in response to transmitting the raw data to the following vehicle. The second prediction about the scene may include segmenting the scene, detecting one or more objects in the scene, and/or classifying one or more objects in the scene. In embodiments, by referring to FIGS. 1, 2, and 4, the lead vehicle system 200 may receive a second prediction made by the following vehicle system 220. The second prediction may classify the object 130 as a traffic cone with a probability of 88 percent and classify the object 140 as a pedestrian with a probability of 15 percent, and as a tree with a probability of 80 percent. The lead vehicle system 200 may also receive an additional prediction, e.g., a third prediction, made by the following vehicle system 260. The third prediction about the scene may include segmenting the scene, detecting one or more objects in the scene, and/or classifying one or more objects in the scene. For example, the third prediction may classify the object 130 as a traffic cone with a probability of 89 percent, and classify the object 140 as a pedestrian with a probability of 10 percent, and as a tree with a probability of 85 percent.

Referring back to FIG. 3, in step 350, the lead vehicle may determine an updated prediction about the scene based on a combination of the first prediction and the second prediction. Combining the outcomes from different neural networks may be implemented using various methods. One method may be an equal averaging method that averages the predictions. In embodiments, by referring to FIGS. 2 and 4, the lead vehicle system 200 may average prediction probabilities for each objects. For example, the lead vehicle system 200 may average the prediction probabilities for the segmented instance 402 made by the neural network 103 of the lead vehicle 102, the neural network 105 of the following vehicle 104, and the neural network 107 of the following vehicle 106. In this example, the average prediction for the segmented instance 402 is a traffic cone with a probability of 89 percent. Similarly, the lead vehicle system 200 may average the probabilities for the segmented instance 404 made by the neural network 103 of the lead vehicle 102, the neural network 105 of the following vehicle 104, and the neural network 107 of the following vehicle 106. In this example, the average prediction for the segmented instance 404 is a tree with a probability of 63 percent of a tree and a pedestrian with a probability of 28 percent. In this example, while the lead vehicle 102 predicts the object 140 as a pedestrian with a higher probability than a tree, the combination of the predictions made by three different neural networks shows a different result than the prediction made solely by the lead vehicle 102.

In some embodiments, the first prediction, the second prediction, and the third prediction may be prediction vectors. The lead vehicle system 200 may determine the updated prediction about the object by averaging the prediction vector of the first prediction, the prediction vector of the second prediction, and the prediction vector of the third prediction. Other methods may be used to combine the outcomes from different neural networks. For example, a machine learning method such as a reinforcement learning method may be used. The outcome from the neural networks 103, 105, and 107 may be input to the box 440 which may be a neural network whose parameters may be adopted based on the comparison of the outcomes from the neural networks 103, 105, and 107 and ground truth information obtained by the lead vehicle. The details of the machine learning method will be described in detail with reference to FIGS. 5 and 6 below.

In some embodiments, the lead vehicle system 200 may compare the first prediction to the second prediction made by the following vehicle system 220 and/or the third prediction made by the following vehicle system 260. If the first prediction is significantly different from the second prediction and/or the third prediction, the lead vehicle system 200 may instruct the lead vehicle 102 to opt out of the vehicle platoon system 100. Similarly, the following vehicle system 220 may receive the first prediction from the lead vehicle system 200 and the third prediction from the following vehicle system 260, and compare the second prediction to the first prediction made by the lead vehicle system 200 and/or the third prediction made by the following vehicle system 260. If the second prediction is significantly different from the first prediction and/or the third prediction, the following vehicle system 220 may instruct the following vehicle 104 to opt out of the vehicle platoon system 100.

Figure 5:
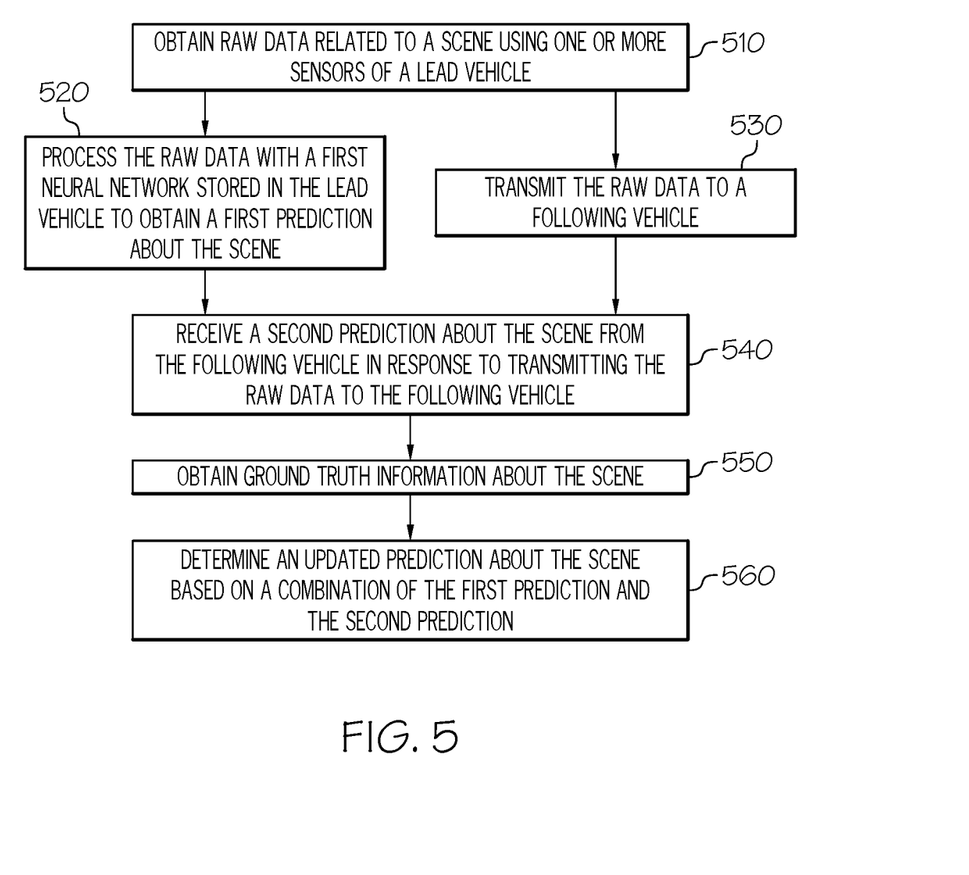
FIG. 5 depicts a flowchart for implementing a machine learning method, according to one or more embodiments shown and described herein.

FIG. 5 depicts a flowchart for implementing a machine learning method, according to one or more embodiments shown and described herein.

In step 510, a lead vehicle may obtain raw data related to a scene including an object using one or more sensors of the lead vehicle. In embodiments, by referring to FIGS. 1, 2 and 4, the lead vehicle system 200 may obtain an image 114 of an external view or a scene of the lead vehicle 102 from one or more sensors 208. The image 114 may include the object 130 and the object 140. Ranging sensors such as radar sensors may be also used to determine a rough depth and speed information for the external view or the scene.

Referring back to FIG. 5, in step 520, a lead vehicle processes the raw data with a first neural network stored in the lead vehicle to obtain a first prediction about the scene. The first prediction about the scene may include segmenting the scene, detecting one or more objects in the scene, and/or classifying one or more objects in the scene. In embodiments, by referring to FIGS. 1, 2 and 4, the lead vehicle system 200 may process the image 114 using the neural network 103 to detect objects in the image 114. In embodiments, the captured image 114 may be segmented out at the instance level. Any object detection algorithm may be used to detect objects in the captured image. For example, as illustrated in FIG. 4, the lead vehicle system 200 may segment instances 402 and 404 from the captured image 114. Then, the segmented instances 402 and 404 may be input to the neural network 103. The neural network 103 may be a convolutional neural network that extracts features from each segmented instance and classifies the features as one of a known class with a probability. The neural network 103 may output classifications of the segmented instances 402 and 404 along with probabilities. For example, as illustrated in FIG. 4, the neural network 103 may predict the object 130 as a traffic cone with a probability of 90 percent. The neural network 103 may predict the object 140 as a pedestrian with a probability of 60 percent, and as a tree with a probability of 35 percent.

Referring back to FIG. 5, in step 530, the lead vehicle may transmit the raw data to a following vehicle. In embodiments, by referring to FIGS. 1, 2, and 4, the lead vehicle system 200 may transmit the image 114 captured by the lead vehicle 102 to following vehicles 104 and 106. The following vehicle system 220 of the following vehicle 104 may process the image 114 using the neural network 105 to classify objects in the image 114. In embodiments, the captured image 114 may be segmented out at the instance level. Any object detection algorithm may be used to detect objects in the captured image. For example, as shown in FIG. 4, the lead vehicle system 200 may segment instances 402 and 404 from the captured image 114. Then, the segmented instances 402 and 404 may be input to the neural network 105. The neural network 105 may be a convolutional neural network that extracts features from each segmented instance and classifies the features as one of a known class with a probability. The neural network 105 may output classifications of the segmented instances 402 and 404 along with probabilities. For example, as illustrated in FIG. 4, the neural network 105 may classify the object 130 as a traffic cone with a probability of 88 percent. The neural network 105 may classify the object 140 as a pedestrian with a probability of 15 percent, and as a tree with a probability of 80 percent.

Referring back to FIG. 5, in step 540, the lead vehicle may receive a second prediction about the scene from the following vehicle in response to transmitting the raw data to the following vehicle. The second prediction about the scene may include segmenting the scene, detecting one or more objects in the scene, and/or classifying one or more objects in the scene. In embodiments, by referring to FIGS. 1, 2, and 4, the lead vehicle system 200 may receive a second prediction made by the following vehicle system 220. The second prediction may classify the object 130 as a traffic cone with a probability of 88 percent and classify the object 140 as a pedestrian with a probability of 15 percent, and as a tree with a probability of 80 percent. The lead vehicle system 200 may also receive an additional prediction, e.g., a third prediction, made by the following vehicle system 260. The third prediction about the scene may include segmenting the scene, detecting one or more objects in the scene, and/or classifying one or more objects in the scene. For example, the third prediction may classify the object 130 as a traffic cone with a probability of 89 percent, and classify the object 140 as a pedestrian with a probability of 10 percent, and as a tree with a probability of 85 percent.

Referring back to FIG. 5, in step 550, the lead vehicle may obtain ground truth information about the scene. In embodiments, by referring to FIG. 6, the lead vehicle 102 may obtain ground truth information about the objects 130 and 140 when the lead vehicle 102 is sufficiently close to the objects 130 and 140. For example, the lead vehicle 102 may capture images of the objects 130 and 140 when the lead vehicle 102 is very close to the objects 130 and 140 and obtain ground truth that the object 130 is a tree and the object 140 is a traffic cone based on the captured images.

Referring back to FIG. 5, in step 560, the lead vehicle may update one or more parameters of the first neural network based on a comparison of the ground truth information, the first prediction and the second prediction. In embodiments, by referring to FIGS. 2 and 6, the lead vehicle 102 may compare the ground truth information, to the prediction made by the neural network 103, the prediction made by the neural network 105, and the prediction made by the neural network 107. Based on the comparison, the lead vehicle system 200 of the lead vehicle 102 may update the one or more parameters of the neural network 103. In this example, the ground truth about the object 130 is a tree and the ground truth about the object 140 is a traffic cone. For example, the predictions made by the neural networks 103, 105, and 107 regarding the objects 130 and 140 are shown in the table below.

Figure 6:
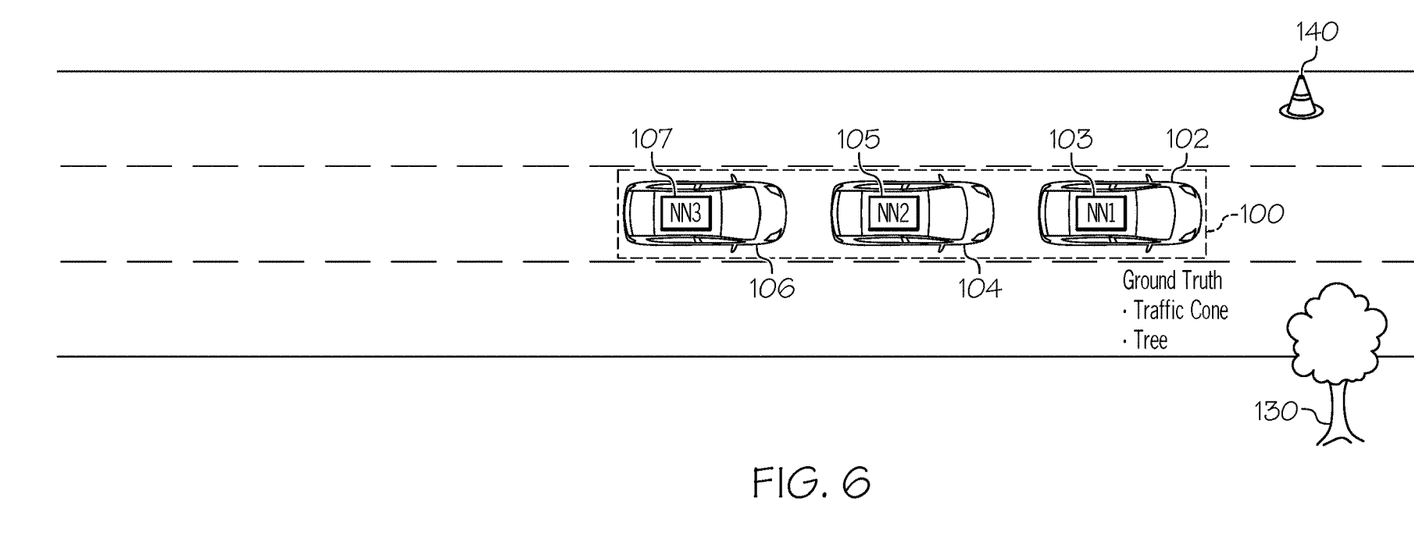
FIG. 6 depicts detecting ground truth by a lead vehicle, according to another embodiment shown and described herein.

|  | Neural Network 103 | Neural Network 105 | Neural Network 107 |
| --- | --- | --- | --- |
| Object 130 | Pedestrian: 60%<br>Tree: 35% | Pedestrian: 15%<br>Tree: 80% | Pedestrian: 10%<br>Tree: 85% |
| Object 140 | Traffic Cone: 90% | Traffic Cone: 88% | Traffic Cone: 89% |

The predictions made by the neural networks 105 and 107 are more accurate than the prediction made by the neural network 103 regarding the object 130 because the predictions made by the neural networks 105 and 107 are closer to the ground truth than the prediction made by the neural network 103. Based on the comparison, the lead vehicle system 200 of the lead vehicle 102 may update the one or more parameters of the neural network 103 based on the parameters of the neural network 105 or the neural network 107. The lead vehicle system 200 of the lead vehicle 102 may update the one or more parameters of the neural network 103 such that the neural network 103 may predict the object 130 as a tree with a higher probability than 35 percent in response to receiving the image 114 as an input.

As another example, the predictions made by the neural networks 103, 105, and 107 regarding the objects 130 and 140 are shown in the table below.

|  | Neural Network 103 | Neural Network 105 | Neural Network 107 |
| --- | --- | --- | --- |
| Object 130 | Pedestrian: 5%<br>Tree: 90% | Pedestrian: 15%<br>Tree: 80% | Pedestrian: 10%<br>Tree: 85% |
| Object 140 | Traffic Cone: 90% | Traffic Cone: 88% | Traffic Cone: 89% |

In this case, the predictions made by the neural network 103 is more accurate than the predictions made by the neural networks 105 and 107 regarding the objects 130 and 140 because the predictions made by the neural network 103 are closer to the ground truth than the predictions by the neural networks 105 and 107. Based on the comparison, the lead vehicle system 200 of the lead vehicle 102 may update the one or more parameters of the neural network 103. For example, the lead vehicle system 200 of the lead vehicle 102 may update the one or more parameters of the neural network 103 such that the neural network 103 may predict the object 130 as a tree and the object as a traffic cone with an increased probability (e.g., over 90 percent for the tree and over 90 percent for the traffic cone) in response to receiving the image 114 as an input.

Figure 7:
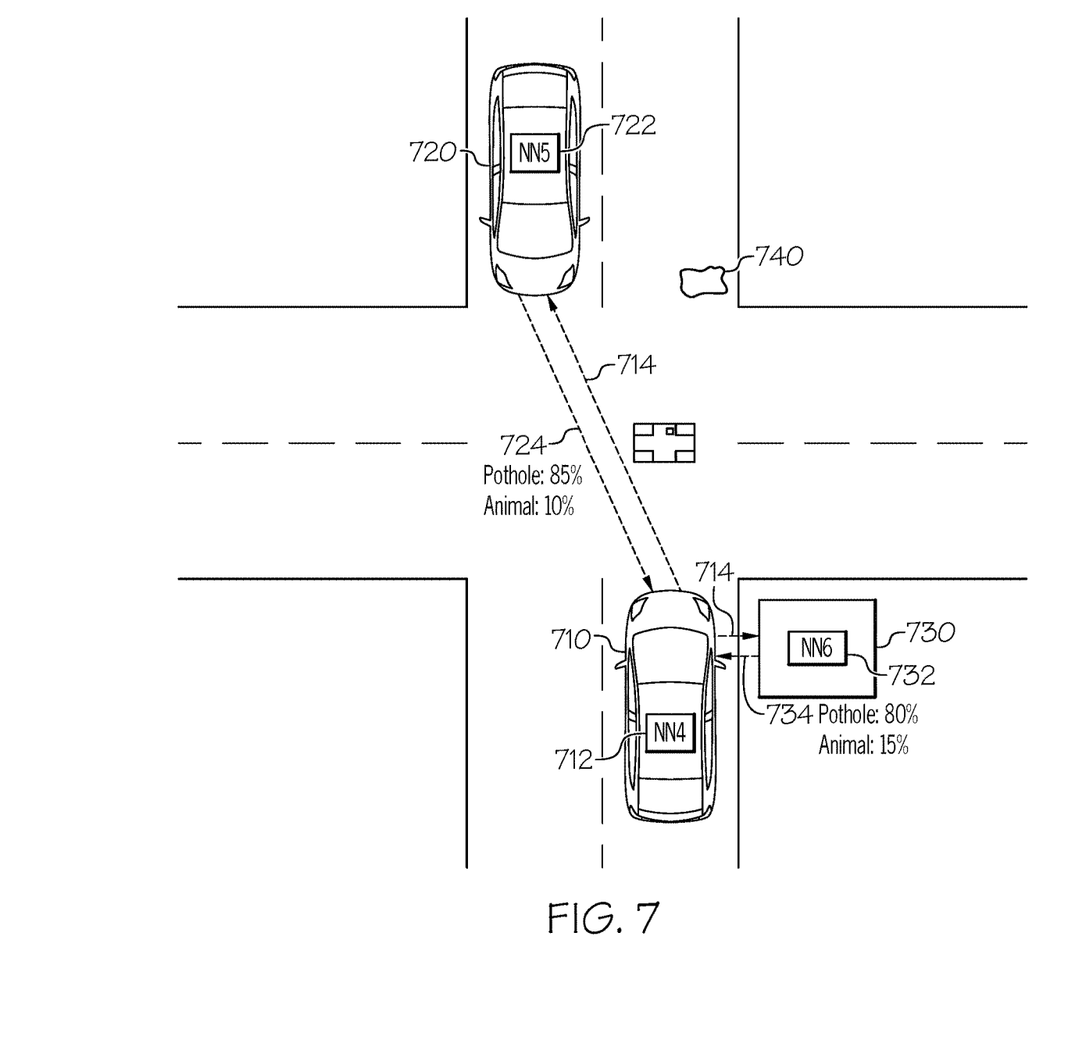
FIG. 7 depicts a combination of vehicles and an edge device that perceives a scene with or without external objects using different neural networks stored in different vehicles and the edge device, according to another embodiment shown and described herein.

FIG. 7 depicts a combination of vehicles and an edge device that detects and classifies external objects using different neural networks stored in different vehicles and the edge device, according to another embodiment shown and described herein.

In embodiments, a group of a vehicle 710, a vehicle 720, and an edge server 730 may constitute a temporary platoon similar to the vehicle platoon system 100 in FIG. 1. The vehicle 710 and the vehicle 720 may temporarily stop at a cross-section, and the edge server 730 may be a road-side unit. The vehicle 710 may communicate with the vehicle 720 and the edge server 730 via V2V or V2X communication. The vehicle 710 may include a system similar to the lead vehicle system 200 in FIG. 2 and the vehicle 720 may include a system similar to the following vehicle system 220 in FIG. 2. The vehicle 720 stops at an intersection. As a consequence, the vehicle 720 may turn off or reduce use of some sensors (e.g., long distance radar sensors, Lidar sensors, and some cameras) and/or slow down or stop processing tasks (e.g., computationally intensive neural network execution tasks related to a particular vehicle) and operate mainly utilizing radar sensors and vehicle-to-vehicle (V2V) or vehicle-to-everything (V2X) communication.

The vehicle 710 may obtain raw data related to a scene including an object 740 using one or more sensors of the vehicle 710. In embodiments, by referring to FIGS. 2 and 7, the vehicle system 200 may obtain an image 714 of an external view or a scene of the vehicle 710 from one or more sensors 208. The image 714 may include the object 740. Ranging sensors such as radar sensors may be also used to determine a rough depth and speed information for the external view or the scene.

The vehicle 710 may process the image 714 using a neural network NN4 712 stored in the vehicle 710 to classify the object in the image 714. In embodiments, the captured image 714 may be segmented out at the instance level. Any object detection algorithm may be used to detect objects in the captured image. For example, the vehicle 710 may segment instances from the captured image 714. Then, the segmented instances may be input to the neural network 712. The neural network 712 may be a convolutional neural network that extracts features from each segmented instance and classifies the features as one of a known class with a probability. The neural network 712 may output classifications of segmented instances along with probabilities. For example, the neural network 712 may predict the object 740 as a pothole with a probability of 30 percent and as an animal with a probability of 65 percent.

The vehicle 710 may transmit the image 714 captured by the vehicle 710 to the vehicle 720 and the edge server 730. The vehicle 720 may process the image 714 using a neural network NN5 722 stored in the vehicle 720 to classify objects in the image 714. The neural network 722 is different form the neural network 712. For example, the parameters, nodes and/or layers of the neural network 722 may be different from the parameters, nodes and/or layers of the neural network 712. The neural network 722 may be a convolutional neural network that extracts features from each segmented instance and classifies the features as one of a known class with a probability. The neural network 722 may output classifications of segmented instances along with probabilities. For example, as illustrated in FIG. 7, the neural network 712 may predict the object 740 as a pothole with a probability of 85 percent and as an animal with a probability of 10 percent.

Similarly, the edge server 730 may process the image 714 using a neural network NN6 732 stored in the edge server 730 to classify objects in the image 714. The neural network 732 is different form the neural network 712. For example, the parameters, nodes and/or layers of the neural network 732 may be different from the parameters, nodes and/or layers of the neural network 712. In embodiments, the captured image 714 may be segmented out at the instance level. Any object detection algorithm may be used to detect objects in the captured image. The neural network 732 may output classifications of segmented instances along with probabilities. For example, as illustrated in FIG. 7, the neural network 732 may predict the object 740 as a pothole with a probability of 80 percent and as an animal with a probability of 15 percent.

Then, the vehicle 710 may receive predictions about the object 740 from the vehicle 720 and the edge server 730. In embodiments, by referring to FIG. 7, the vehicle 710 may receive a prediction 724 made by the vehicle 720 and a prediction 734 made by the edge server 730. The vehicle 710 may determine an updated prediction about the object 740 based on a combination of the prediction made by the vehicle 710, the prediction 724 made by the vehicle 720, and the prediction 734 made by the edge server 730. Combining the outcomes from different neural networks may be implemented using various methods. As discussed above, the predictions may be combined, for example, using an equal averaging method or a reinforcement learning method.

In some embodiments, because the vehicle 720 is close to the object 740, the vehicle may obtain ground truth information about the object 740 and transmit the ground truth about the object 740 to the vehicle 710. The vehicle 710 may compare the prediction made by the vehicle 710 to the ground truth received from the vehicle 720 and update the parameters of the neural network 712 based on the comparison.

While FIG. 7 depicts a combination of two vehicles and an edge server, any other combination may be used to classify an object using different neural networks. For example, a combination of a ground vehicle, an unmanned aerial vehicle, and an edge server may be used to classify an object. The ground vehicle, the unmanned aerial vehicle, and the edge server may store different neural networks for classifying objects, respectively. As another example, a combination of multiple vehicles and a mobile device carried by a person may be used to classify an object. The multiple vehicle and the mobile device may store different neural networks for classifying objects, respectively. In some embodiments, one or more moving vehicles and one or more parked vehicles in combined may be used to enhance scene perception using different neural networks. In this example, one or more parked vehicles may operate similar to the following vehicles 104 or 106 because the one or more parked vehicles may turn off or reduce use of some sensors (e.g., long distance radar sensors, Lidar sensors, and some cameras) and/or slow down or stop processing tasks (e.g., computationally intensive neural network execution tasks related to a particular vehicle).

It should be understood that embodiments described herein are directed to methods and systems for perceiving a scene with or without objects external to a vehicle platoon using different neural networks stored in different vehicles of the vehicle platoon. According to the present disclosure, a vehicle platoon includes a lead vehicle and one or more following vehicles. The one or more following vehicles may have a relatively easier driving environment as compared to the lead vehicle. The following vehicles may only be required to stay in a lane and maintain a certain distance from the vehicle ahead. As a consequence, the following vehicles may turn off or reduce use of some sensors (e.g., long distance radar sensors, Lidar sensors, and some cameras) and/or slow down or stop processing tasks (e.g., computationally intensive neural network execution tasks related to the particular vehicle) and operated mainly utilizing radar sensors and V2X communication. The saved processing power of the following vehicles may be redirected to help improve the neural network performance of the lead vehicle. Specifically, each of the following vehicles may receive raw data from the lead vehicle and process the raw data using its own neural network that is different from the neural network of the lead vehicle. The predictions by the neural networks of the following vehicles may be transmitted to the lead vehicle. The lead vehicle may combine its predictions made by the neural network of the lead vehicle and the predictions made by the neural networks of the following vehicles. The combined predictions may hence overall performance of the vehicle platoon because the combined prediction may enhance the accuracy of the prediction by the lead vehicle. For example, the combined prediction may prevent erroneous prediction by the lead vehicle due to errors in sensors, the neural network, or any other processing error.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   one or more sensors configured to obtain raw data related to a scene;
   a controller configured to:
   select a first neural network among a plurality of neural networks stored in one or more memory modules based on a position of the vehicle in a platoon;
   transmit information about the selected first neural network to another vehicle in the platoon;
   process the raw data with the first neural network to obtain a first prediction about the scene including a first classification probability of an object in the scene;
   transmit the raw data to the another vehicle;
   receive a second prediction about the scene including a second classification probability of the object in the scene from the another vehicle in response to transmitting the raw data to the another vehicle, the second prediction being obtained by processing the raw data with a second neural network of the another vehicle; and
   determine an updated prediction about the scene including an updated classification probability of the object in the scene based on a combination of the first prediction and the second prediction.

2. The vehicle of claim 1, wherein the second prediction about the scene is obtained based on the raw data and the second neural network stored in the another vehicle; and the second neural network is different from the first neural network.

3. The vehicle of claim 1, wherein the first prediction and the second prediction are prediction vectors; and
the updated prediction about the scene is determined by averaging the prediction vector of the first prediction and the prediction vector of the second prediction.

4. The vehicle of claim 1, wherein the controller is further configured to:
obtain ground truth information about the scene; and
in response to determining that the second prediction matches with the ground truth information and the first prediction does not match with the ground truth information, update one or more parameters of the first neural network based on parameters of the second neural network.

5. The vehicle of claim 4, wherein the ground truth information is obtained by capturing an image of the scene when the vehicle is within a predetermined distance from the object in the scene.

6. The vehicle of claim 1, wherein the controller is further configured to:
choose the first neural network among the plurality of neural networks; and
broadcast information about the first neural network.

7. The vehicle of claim 1, wherein
the vehicle transmits the raw data to the another vehicle via vehicle-to-vehicle communication.

8. The vehicle of claim 1, wherein the first prediction about the scene includes one of: detections of one or more objects in the scene, predicted classifications about one or more objects in the scene, or segmentation of the scene, and
the second prediction about the scene includes one of detections of: one or more objects in the scene, predicted classifications about one or more objects in the scene, or segmentation of the scene.

9. The vehicle of claim 1,
wherein the controller is further configured to:
obtain ground truth information about the scene;
determine whether the second prediction is closer to the ground truth information than the first prediction; and
update one or more parameters of the first neural network based on one or more parameters of the second neural network in response to determining that the second prediction is closer to the ground truth information than the first prediction.

10. A vehicle platoon system comprising:
a first vehicle comprising:
one or more sensors configured to obtain raw data related to a scene;
a first controller configured to:
select a first neural network among a plurality of neural networks stored in the first vehicle based on a position of the first vehicle in a platoon;
transmit information about the selected first neural network to a second vehicle in the platoon; and
process the raw data with the first neural network to obtain a first prediction about the scene including a first classification probability of an object in the scene; and
the second vehicle comprising:
a second controller configured to:
select a second neural network among the plurality of neural networks stored in the second vehicle in response to receiving the information about the first neural network from the first vehicle; and
process the raw data received from the first vehicle with the second neural network to obtain a second prediction about the scene including a second classification probability of the object in the scene,
wherein the first controller is configured to:
transmit the raw data to the second vehicle;
receive the second prediction about the scene from the second vehicle in response to transmitting the raw data to the second vehicle; and
determine an updated prediction about the scene including an updated classification probability of the object in the scene based on a combination of the first prediction and the second prediction.

11. The vehicle platoon system of claim 10, wherein the first vehicle and the second vehicle constitute a vehicle platoon; and
the second controller is further configured to:
compare the first prediction and the second prediction; and
instruct the second vehicle to opt out of the vehicle platoon based on the comparison of the first prediction and the second prediction.

12. The vehicle platoon system of claim 10, wherein the first vehicle and the second vehicle constitute a vehicle platoon; and
the first controller is further configured to:
compare the first prediction and the second prediction; and
instruct the first vehicle to opt out of the vehicle platoon based on the comparison of the first prediction and the second prediction.

13. The vehicle platoon system of claim 10, wherein the first vehicle chooses the first neural network among the plurality of neural networks, and broadcast information about the first neural network to the second vehicle; and
the second vehicle chooses the second neural network among the plurality of neural network in response to receiving the information about the first neural network.

14. The vehicle platoon system of claim 10, wherein the second neural network is different from the first neural network.

15. The vehicle platoon system of claim 10,
wherein the first vehicle obtains ground truth information about the scene;
determines whether the second prediction is closer to the ground truth information than the first prediction; and
updates one or more parameters of the first neural network based on one or more parameters of the second neural network in response to determining that the second prediction is closer to the ground truth information than the first prediction.

16. A method comprising:
selecting a first neural network among a plurality of neural networks stored in a lead vehicle based on a position of the lead vehicle in a platoon;
transmitting information about the selected first neural network to a following vehicle in the platoon;
obtaining raw data related to a scene using one or more sensors of the lead vehicle;
processing the raw data with the first neural network to obtain a first prediction about the scene including a first classification probability of an object in the scene;
transmitting the raw data to the following vehicle;
receiving a second prediction about the scene including a second classification probability of the object in the scene from the following vehicle in response to transmitting the raw data to the following vehicle, the second prediction being obtained by processing the raw data with a second neural network of the following vehicle;

determining an updated prediction about the scene including an updated classification probability of the object in the scene based on a combination of the first prediction and the second prediction;

obtaining ground truth information about the scene;

determining whether the second prediction is closer to the ground truth information than the first prediction; and updating one or more parameters of the first neural network based on one or more parameters of the second neural network in response to determining that the second prediction is closer to the ground truth information than the first prediction.

17. The method of claim 16, wherein the first prediction and the second prediction are prediction vectors; and wherein determining the updated prediction about the scene based on the combination of the first prediction and the second prediction comprises determining the updated prediction about the scene by averaging the prediction vector of the first prediction and the prediction vector of the second prediction.

* * * * *

UNITED STATES PATENT AND TRADEMARK OFFICE
CERTIFICATE OF CORRECTION

PATENT NO. : 12,169,775 B2
APPLICATION NO. : 17/066004
DATED : December 17, 2024
INVENTOR(S) : Hongsheng Lu et al.

Page 1 of 1

It is certified that error appears in the above-identified patent and that said Letters Patent is hereby corrected as shown below:

On the Title Page

Item (52), U.S. Cl., CPC, delete "G05D 1/0291 (2013.01)" and insert --G05D 1/0291 (2024.01)--, therefor.

Item (57), abstract, Line(s) 4, before "machine", delete "one".

In the Specification

In Column 3, Line(s) 35, delete "hence" and insert --enhance--, therefor.

In Column 10, Line(s) 58, delete "obtains" and insert --obtain--, therefor.

In Column 12, Line(s) 35, delete "objects" and insert --object--, therefor.

In Column 17, Line(s) 42, delete "vehicle" and insert --vehicles--, therefor.

Signed and Sealed this
Twenty-fifth Day of February, 2025

Coke Morgan Stewart
*Acting Director of the United States Patent and Trademark Office*